United States Patent Office 3,109,845
Patented Nov. 5, 1963

3,109,845
1 - CYCLOHEXYL, 1 - CYCLOHEXENYL, 1 - FURYL, AND 1-THIENYL, TERTIARY AMINO SUBSTITUTED METHANES
Ernst Seeger and August Kottler, Biberach an der Riss, Germany, assignors to Dr. Karl Thomae G.m.b.H., Biberach an der Riss, Germany, a corporation of Germany
No Drawing. Filed Feb. 4, 1960, Ser. No. 6,616
11 Claims. (Cl. 260—293)

This is a continuation-in-part of copending application Serial No. 710,186, filed January 21, 1958, now abandoned, which in turn is a continuation-in-part of application Serial No. 544,385, filed September 21, 1955, now abandoned.

This invention relates to novel tertiary amines having useful pharmacological properties and to their non-toxic acid addition salts and quaternary compounds.

More particularly, the present invention relates to tertiary amines having the general structural formula

(I)

wherein

X is 2,5-endomethylene-cyclohexenyl, 2,5 - endomethylene-cyclohexyl, cyclohexenyl, cyclohexyl, furyl or thienyl, Y is alkyl with 2 to 7 carbon atoms, cycloalkyl, naphthyl, monocyclic aryl, monocyclic aryl-substituted lower alkyl, lower alkoxy-substituted monocyclic aryl, lower alkyl-substituted monocyclic aryl, (lower alkoxy-substituted-monocyclic aryl)-substituted lower alkyl or (lower alkyl-substituted monocyclic aryl)-substituted lower alkyl, and $R_1$ and $R_2$ are alkyl with 1 to 6 carbon atoms, hydroxy-substituted alkyl with 1 to 6 carbon atoms, cyclohexyl, phenyl, benzyl or, together with each other and the adjacent nitrogen atom, form a heterocyclic radical, such as piperidyl, morpholyl or pyrrolidyl, and their non-toxic, pharmacologically useful acid addition salts and quaternary compounds.

The tertiary amines having the above structural Formula I may be produced by reacting α-tertiary aminoacetonitriles having the structural formula

(II)

wherein X, $R_1$ and $R_2$ have the meaning defined above, with an organic magnesium halide having the structural formula

Y—Mg—Hal   (III)

wherein Y has the meaning defined above and Hal represents a halogen with an atomic weight from 35 to 127, inclusive, i.e. chlorine, bromine or iodine. The reaction between Compounds II and III is advantageously carried out in the presence of a suitable organic solvent, such as ether or benzene, or a mixture of organic solvents, such as benzene and tetrahydrofuran. The preferred method consists of refluxing the reaction mixture at the boiling point of the particular solvent employed as the reaction medium at atmospheric pressure, although the reaction will also proceed at moderately elevated temperatures below the boiling point of the solvent and without reflux.

The resulting tertiary amines may be readily converted into their non-toxic acid addition salts or quaternary compounds by the customary methods.

The following examples will illustrate the preparation of various representative compounds of the group defined by Formula I above and will enable others skilled in the art to understand the present invention more completely. It will be understood, however, that the invention is not limited to the particular compounds illustrated in these examples.

EXAMPLE I

[2,5-Endomethylene-Cyclohexene-(3)-Yl]-Piperidyl-(1)-Phenyl-Methane 16.2 gm. of [2,5-endomethylene-cyclohexene-(3)-yl]-piperidyl-(1)-acetonitrile were dissolved in 30 cc. absolute ether, and the resulting solution was added dropwise to a Grignard reagent prepared in the usual manner from 4.6 gm. magnesium turnings and 31.4 gm. bromobenzene in anhydrous ether. The resulting mixture was refluxed for 3 hours, cooled, and the reaction product was admixed with ice and 12% hydrochloric acid. The ethereal phase was separated and discarded. Ammonium chloride and concentrated ammonia were added to the aqueous phase in an amount sufficient to render the same alkaline. The precipitated oil was dissolved in ether, the ethereal solution was dried over sodium sulfate, and the ether was evaporated. The residue was distilled in a vacuum and yielded 14 gm. of a slightly yellowish oil having a boiling point of 121° C. at 0.2 mm. Hg and a structural formula

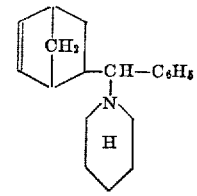

The free base was converted with ethereal hydrochloric acid into its colorless hydrochloride having a melting point of 223° C.

EXAMPLE II

1-[2,5-Endomethylene-Cyclohexene-(3)-Yl]-1-Dimethylamino-4-Phenyl-Butane 13.2 gm. [2,5-endomethylene-cyclohexene-(3)-yl]-dimethylamino-acetonitrile were dissolved in 30 cc. ether and the solution was added dropwise to a Grignard reagent prepared from 4.6 gm. magnesium turnings and 39.8 gm. of γ-phenyl propyl bromide in anhydrous ether. The mixture was then heated for 3 hours and worked up by following the procedure described in Example I. 15.0 gm. of a compound having the structural formula

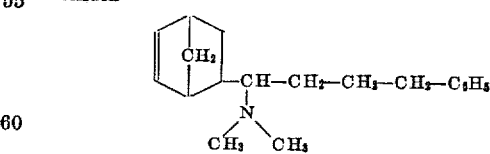

and a boiling point of 138° C. at 0.15 mm. Hg were obtained in the form of a colorless oil.

Its hydrochloride was a colorless compound having a melting point of 153° C.

EXAMPLE III

1-[2,5-Endomethylene-Cyclohexene-(3)-Yl]-1-Piperidyl-(1)-5-Phenyl-Pentane

A Grignard solution produced from 1.2 gm. magnesium turnings and 8.5 gm. Δ8-phenyl-butyl-chloride in ether was reacted with 3.6 gm. [2,5-endomethylene cyclohexene-(3)-yl]-piperidyl-(1)-acetonitrile and the reaction mixture was worked up as described in Example I. 3.5 gm. of a compound having the structural formula

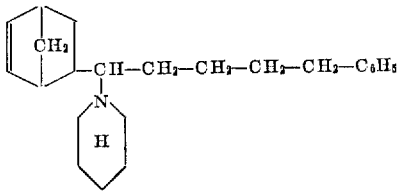

were obtained in the form of a yellowish oil having a boiling point of 198–200° C. at 0.7 mm. Hg.

EXAMPLE IV

*[2,5-Endomethylene-Cyclohexene-(3)-Yl]-Dibutyl-amino-α-Naphthyl Methane*

A Grignard solution was prepared from 4.6 gm. magnesium and 41.1 gm. α-bromo-naphthalene in ether and was reacted with 19.5 gm. [2,5-endomethylene-cyclohexene-(3)-yl]-dibutylamino-acetonitrile in accordance with the procedure described in Example I. A compound having the structural formula

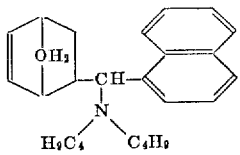

was obtained in the form of a viscous yellow oil having a boiling point of 180° C. at 0.3 mm. Hg. Yield: 17 gm.

EXAMPLE V

*1-[2,5-Endomethylene-Cyclohexene-(3)-Yl]-1-Piperidyl-(1)-2-(4-Methyl-Phenyl)-Ethane*

8.3 gm. [2,5 - endomethylene-cyclohexene-(3)-yl]-1-piperidyl-(1)-acetonitrile were added to a Grignard compound prepared from 2.3 gm. magnesium and 18.5 gm. p-xylyl-bromide in ether. The reaction mixture was worked up as described in Example I. 9 gm. of a compound having the structural formula

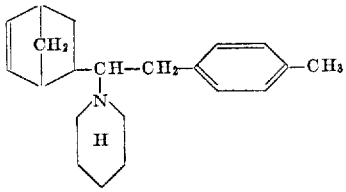

and a boiling point of 151–152° C. at 0.5 mm. Hg were obtained.

Its hydrochloride melted at 195° C.

EXAMPLE VI

*[2,5-Endomethylene-Cyclohexene-(3)-Yl]-Dimethyl-amino-Cyclohexyl-Methane*

An ethereal Grignard solution prepared from 4.6 gm. magnesium and 23.6 gm. cyclohexyl chloride was reacted with 8.8 gm. [2,5-endomethylene-cyclohexene-(3)-yl]-dimethylamino-acetonitrile in accordance with the procedure described in Example I. 7.5 gm. of a compound having the structural formula

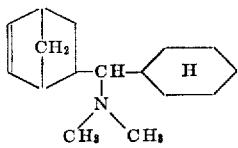

were obtained in the form of a colorless liquid having a boiling point of 63° C. at 0.5 mm. Hg.

EXAMPLE VII

*[2,5-Endomethylene-Cyclohexene-(3)-Yl]-Morpholyl-(4)-Phenyl-Methane*

An ethereal Grignard solution prepared from 2.3 gm. magnesium and 15.7 gm. bromobenzene was freed from ether, 50 cc. anhydrous benzene were added thereto, and the mixture was heated under reflux with a solution of 8.2 gm. [2,5 - endomethylene-cyclohexene-(3)-yl]-morpholyl-(4)-acetonitrile in 20 cc. benzene, the benzene solution being added slowly. Thereafter, the reaction mixture was decomposed by adding ice and dilute hydrochloric acid. The benzene layer was separated and discarded. Ammonium chloride was added to the aqueous hydrochloric acid layer, sufficient ammonia was then added to the mixture to render it alkaline, and the alkaline mixture was extracted three times with ether. The combined ethereal solutions were dried over sodium sulfate. The ether was evaporated and the residue was distilled in a vacuum. 7 gm. of a compound having the structural formula

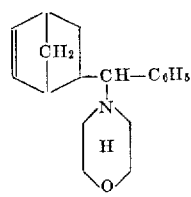

were obtained in the form of a yellowish oil having a boiling point of 146–147° C. at 0.2 mm. Hg.

EXAMPLE VIII

*[2,5-Endomethylene-Cyclohexene-(3)-Yl]-Piperidyl-(1)-(3-Methyl-Phenyl)-Methane*

An ethereal Grignard solution prepared from 2.3 gm. magnesium and 17.0 gm. m-bromo-toluene was reacted with 8.1 gm. [2,4-endomethylene-cyclohexene-(3)-yl]-piperidyl-(1)-acetonitrile in accordance with the procedure described in Example I. A compound having the structural formula

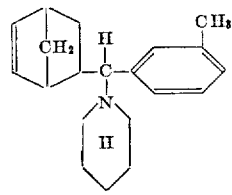

was obtained in the the form of a viscous, colorless oil having a boiling point of 138° C. at 0.2 mm. Hg. Yield: 8.0 gm.

EXAMPLE IX

*[2,5-Endomethylene-Cyclohexene-(3)-Yl]-Piperidyl-(1)-(4-Methyl-Phenyl)-Methane*

The procedure described in Example VIII was repeated, except that p-bromo toluene was used in place of m-bromo-toluene. 8 gm. of a compound having the structural formula

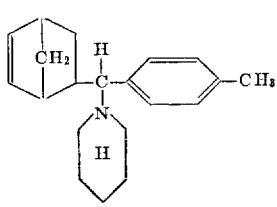

and a boiling point of 141° C. at 0.1 mm. Hg and a melting point of 70–71° C. were obtained.

EXAMPLE X

*[2,5-Endomethylene-Cyclohexene-(3)-Yl]-Piperidyl-(1)-Phenyl-Methane*

The procedure described in Example I was repeated, except that the ether was evaporated from the Grignard solution before reaction with the acetonitrile and the reaction was effected in solution in a mixture of benzene and tetrahydrofuran (2:1). The final reaction product was the same tertiary amine as that described in Example I.

EXAMPLE XI

*1-Cyclohexyl-1-Diethylamino-3-Phenyl-Propane*

7.3 gm. cyclohexyl-diethylamino-acetonitrile were reacted in ethereal solution with a Grignard compound prepared from 2.3 gm. magnesium and 18.5 gm. phenylethyl-bromide. The reaction mixture was worked up as described in Example I. 7 gm. of a compound having the structural formula

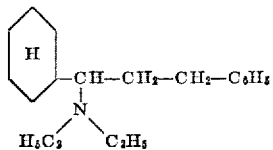

were obtained in the form of a colorles liquid having a boiling point of 142° C. at 0.8 mm. Hg.

Its hydrochloride melted at 141–142° C.

EXAMPLE XII

*1-[2,5-Endomethylene-Cyclohexene-(3)-Yl-1]-1-Piperidyl-Octane*

8.1 gm. [2,5 - endomethylene-cyclohexene-(3)-yl-1]-piperidyl-acetonitrile were reacted with a Grignard compound, prepared from 2.3 gm. magnesium and 17.9 gm. n-heptyl-bromide in anhydrous ether, as described in Example I. 8.1 gm. of a compound having the structural formula

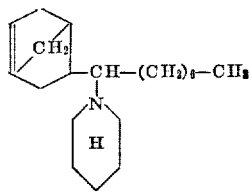

and a boiling point of 140° C. at 0.3 mm. Hg. The yield was 75% of theory.

EXAMPLE XIII

*1-Cyclohexyl-1-Pyrrolidyl-(1)-3-Methyl-3-Phenyl-Propane*

7.2 gm. cyclohexyl-pyrrolidyl-(1)-acetonitrile were reacted with a Grignard solution prepared from 2.3 gm. magnesium and 19.9 gm. (β-bromo-isopropyl)-benzene, and the reaction mixture was worked up as described in Example I. 7 gm. of a compound having the structural formula

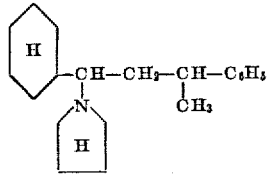

and a boiling point of 150° C. at 0.4 mm. Hg were obtained.

Its colorless hydrochloride melted at 150–151° C.

EXAMPLE XIV

*1-Cyclohexene-(1)-Yl-1-Diethylamino-4-Phenyl-Butane*

7.2 gm. cyclohexene-(1)-yl diethylamino-acetonitrile were reacted with a Grignard compound prepared from 2.3 gm. magnesium and 19.9 gm. γ-phenyl-propyl-bromide, and the reaction mixture was worked up as described in Example I. 6.5 gm. of a compound having the structural formula

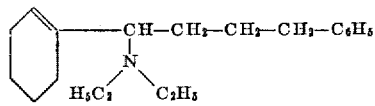

were obtained in the form of an oil having a boiling point of 157–158° C. at 0.6 mm. Hg.

EXAMPLE XV

*1-Furyl-(2)-1-Dimethylamino-2-(4-Methyl Phenyl)-Ethane*

An ethereal Grignard solution, prepared from 2.3 gm. magnesium and 18.5 gm. p-xylyl-bromide, was reacted with 5 gm. furyl-(2)-dimethylamino-acetonitrile and the reaction mixture was worked up as described in Example I. A compound having the structural formula

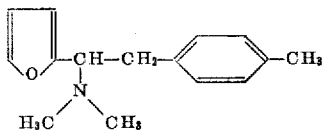

was obtained in the form of a yellowish oil having a boiling point of 123–125° C. at 0.8 mm. Hg. Yield: 6.5 gm.

Its hydrochloride had a melting point of 188–189° C.

EXAMPLE XVI

*Furyl-(2)-Dimethylamino-(α-Naphthyl)-Methane*

An ethereal Grignard solution prepared from 2.3 gm. magnesium and 20.7 gm. α-bromo-naphthalene was reacted with 5.7 gm. of furyl-(2)-dimethylamino-acetonitrile in accordance with the procedure described in Example I. A compound having the structural formula

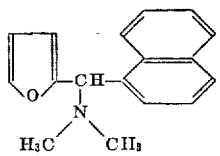

and a boiling point of 123° C. at 0.2 mm. Hg was obtained with a yield of 5.5 gm.

EXAMPLE XVII

*1-Thienyl-(2)-1-Piperidyl-(1)-4-Phenyl-Butane*

A Grignard solution, prepared from 3.6 gm. magnesium and 30 gm. γ-phenyl-propyl-bromide was reacted with 9.8 gm. thienyl-(2)-piperidyl-(1)-acetonitrile in accordance with the procedure described in Example I. A compound having the structure formula

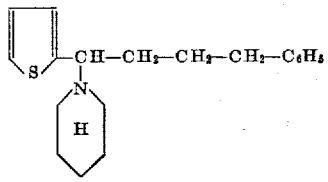

was obtained in the form of an oil having a boiling point of 182° C. at 0.4 mm. Hg. The yield was 9.0 gm.

Its hydrochloride melted at 162° C.

EXAMPLE XVIII

1-Thienyl-(2)-1-Dimethylamino-Propane

A solution of 5.5 gm. thienyl-(2)-dimethylamino-acetonitrile in ether was added dropwise to a Grignard compound prepared from 2.4 gm. magnesium and 10.9 gm. ethyl bromide. The resulting reaction mixture was worked up as described in Example I. The reaction product having the structural formula

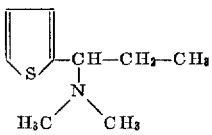

thus obtained was a colorless liquid having a boiling point of 47–48° C. at 0.25 mm. Hg. Yield: 4.5 gm.

Its hydrochloride had a melting point of 121° C.

EXAMPLE XIX

1-[2,5-Endomethylene-Cyclohexene-(3)-Yl]-1-Diethyl-Amino-4-Phenyl-Butane Methoiodide 3 gm. 1-[2,5-endomethylene-cyclohexene-(3)-yl]-1-diethylamino-4-phenyl-butane, obtained by the method described in Example II but using, in place of [2,5-endomethylene - cyclohexene - (3) - yl] - dimethylamino-acetonitrile, an equimolecular amount of [2,5-endomethylene - cyclohexene - (3) - yl] - diethylamino - acetonitrile, were dissolved in 10 cc. anhydrous acetone. 2 gm. methyl iodide were added to the solution and the mixture was gently heated for 4 hours. The quaternary ammonium compound having the structural formula

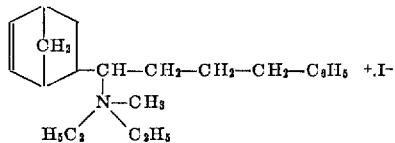

started to crystallize out during heating and was completely precipitated out by adding some ether to the reaction mixture. Its melting point was 158° C.

EXAMPLE XX

[2,5-Endomethylene-Cyclohexene-(3)-Yl]-Pyrrolidyl-(1)-Phenyl-Methane Methoiodide The procedure described in Example XIX was repeated, except that in place of 1-[2,5-endomethylene-cyclohexene - (3) - yl] - 1 - diethylamino - 4 - phenyl-butane an equimolecular amount of [2,5-endomethylene-cyclohexene - (3) - yl] - pyrrolidyl - (1) - phenyl - methane was used. The resulting methoiodide having the structural formula

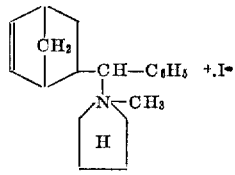

had a melting point of 162–163° C.

The [2,5 - endomethylene - cyclohexene - (3) - yl]-pyrrolidyl - (1) - phenyl - methane was prepared by the method described in Example I, except that in place of [2,5 - endomethylene - cyclohexene - (3) - yl] - piperidyl-(1)-acetonitrile an equimolecular amount of [2,5-endomethylene - cyclohexene - (3) - yl] - pyrrolidyl - (1)-acetonitrile was used.

EXAMPLE XXI

1-Cyclohexyl-1-Dimethylamino-4-Phenyl-Butane Methoiodide

The procedure described in Example XIX was repeated, except that in place of 1-[2,5-endomethylene-cyclohexene - (3) - yl] - 1 - diethylamino - 4 - phenyl-butane an equimolecular amount of 1-cyclohexyl-1-dimethylamino-4-phenyl butane was used. The resulting methoiodide having the structural formula

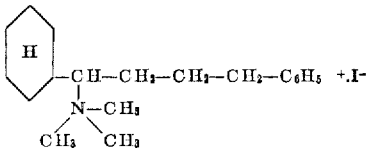

had a melting point of 195–196° C.

The 1 - cyclohexyl - 1 - dimethylamino - 4 - phenyl-butane was prepared by the method described in Example XI, except that in place of cyclohexyl-diethylamino-acetonitrile an equimolecular amount of cyclohexyl-dimethylamino-acetonitrile and, in place of phenyl-ethyl-bromide, an equimolecular amount of phenyl-propyl-bromide was used.

EXAMPLE XXII

1-Cyclohexyl-1-Dimethylamino-3-Phenyl-Propane Benzylobromide 1 gm. 1-cyclohexyl-1-dimethylamino-3-phenyl-propane were dissolved in a small amount of acetone and the resulting solution was heated on a water bath with 3 gm. benzyl bromide. After a short period of time the reaction mixture solidified into crystals. The crystalline mass was triturated with acetone, filtered off on a vacuum filter and washed with ether. Colorless crystals of the quaternary ammonium bromide having the structural formula

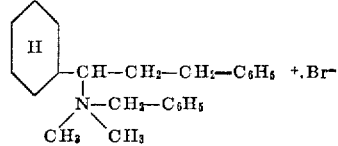

and a melting point of 188–189° C. were obtained.

The 1 - cyclohexyl - 1 - dimethylamino - 3 - phenyl-propane was prepared by the method described in Example XI, except that in place of cyclohexyl-diethyl-amino-acetonitrile, an equimolecular amount of cyclohexyl-dimethylamino-acetonitrile was used.

EXAMPLE XXIII

1-[2,5-Endomethylene-Cyclohexene-(3)-Yl]-1-Bis-(β-Hydroxy-Ethyl)-Amino-2-Phenyl-Ethane 11.8 gm. [2,5-endomethylene-cyclohexene-(3)-yl]-bis-(β-hydroxy ethyl)-amino-acetonitrile were dissolved in 30 cc. anhydrous ether. The resulting solution was added dropwise to a Grignard compound prepared from 4.6 gm. magnesium turnings and 25.2 gm. benzyl chloride in anhydrous ether. The resulting mixture was refluxed for 2 hours and the reaction product, after allowing it to cool was decomposed with ice and dilute hydrochloric acid. The ethereal layer was separated and discarded. Ammonium chloride was added to the aqueous layer which was then made alkaline by adding ammonia. The oil precipitated thereby was dissolved in ether, and the ethereal solution was dried over sodium sulfate. After evaporation of the ether a yellowish, viscous oil remained behind. It was heated to 130° C. in a vacuum of 0.1 mm. Hg for a short period of time to purify it. The reaction product thus obtained had the structural formula

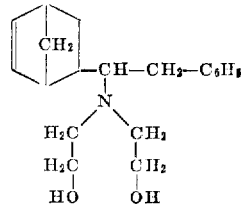

EXAMPLE XXIV

1-[Cyclohexene-(3)-Yl]-1-Pyrrolidyl-2-Phenyl-Ethane 19 gm. cyclohexene-(3)-yl-pyrrolidyl-acetonitrile, having a boiling point of 98° C. at 0.6 mm. Hg were dissolved in 50 cc. anhydrous ether. The resulting solution was added dropwise, while stirring, to a Grignard compound prepared from 4.6 gm. magnesium and 25.2 gm. benzyl chloride. After refluxing the mixture for one hour it was decomposed by adding ice and dilute hydrochloric acid in an amount sufficient to make the aqueous layer acidic. The ethereal layer was separated and discarded. The acidic aqueous layer was made alkaline by adding ammonia. The oil precipitated thereby was extracted with ether. The ether extract solution was evaporated and the residue was distilled in a vacuum. 18.3 gm. of a compound having the structural formula

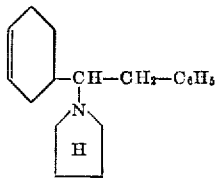

and a boiling point of 111–112° C./0.06 mm. were obtained thereby.

Its colorless hydrochloride melted at 178–179° C.

EXAMPLE XXV

1-[Cyclohexene-(3)-Yl]-1-Diethylamino-4-Phenyl-Butane 19.2 gm. cyclohexene-(3)-yl-diethylamino-acetonitrile, having a boiling point of 116–118° C. at 12 mm. Hg, were dissolved in ether, and the resulting solution was added dropwise, while stirring, to a Grignard compound prepared from 4.6 gm. of magnesium turnings and 39.8 gm. γ-phenyl-propyl-bromide in 100 cc. anhydrous ether. The reaction mixture was worked up as described in Example I. A colorless compound having the structural formula

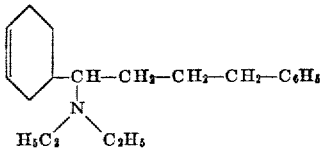

and a boiling point of 134° C. at 0.06 mm. Hg was obtained with a yield corresponding to 82.5% of theory.

EXAMPLE XXVI

1-[Cyclohexene-(3)-Yl]-1-Dimethylamino-2-(4-Methoxy-Phenyl)-Ethane 15 gm. cyclohexene-(3)-yl-dimethylamino-acetonitrile, having a boiling point of 103° C. at 13 mm. Hg, were dissolved in ether. The resulting solution was added dropwise, while stirring, to a Grignard compound prepared by customary methods from 19 gm. magnesium powder and 40 gm. anisyl bromide in ether. The reaction mixture was refluxed for 1½ hours and the reaction product was worked up as described in Example I. A compound having the structural formula

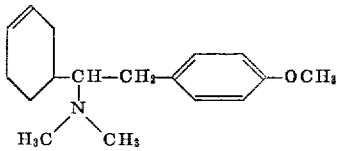

was obtained in the form of a colorless liquid having a boiling point of 134° C. at 0.06 mm. Hg. Yield: 83% of the theoretical yield.

The following table illustrates additional tertiary amines having the structural Formula I above which were produced, and lists their melting and/or boiling points, the melting point of the corresponding hydrochloride addition salt, the acetonitrile and Grignard reagents used, the reaction procedure and the yield in each case.

| Example No. | Tertiary Amine Produced | M.P., ° C. | B.P., ° C./ mm. Hg | M.P. of Hydrochloride, ° C. | Acetonitrile Reagent | Grignard Reagent from magnesium and— | Reaction procedure as in Example No. | Yield, percent of theory |
|---|---|---|---|---|---|---|---|---|
| 27 | 1-[cyclohexene-(3)-yl-1]-1-piperidyl-4-phenyl-butane. | | 134–135/0.06 | 123 | [cyclohexene-(3)-yl-1]-piperidyl-acetonitrile. | γ-phenyl-propyl-bromide. | 1 | 64 |
| 28 | 1-(furyl-2)-di-methyl-amino-2-(4-methyl-phenyl)-ethane. | | 105/0.25 | 189 | (furyl-2)-dimethyl-amino-acetonitrile. | p-xylyl-bromide | 1 | 54 |
| 29 | 1-(furyl-2)-1-di-ethyl-amino-4-phenyl-butane. | | 142/0.7 | | (furyl-2)-diethyl-amino-acetonitrile. | γ-phenyl-propyl-bromide. | 1 | 38 |
| 30 | 1-cyclohexyl-1-di-methyl-amino-3-methyl-3-phenyl-propane. | | 99/0.03 | | cyclohexyl-dimethyl-amino-acetonitrile. | (β-bromo-iso-propyl)-benzene. | 13 | 76 |
| 31 | 1-(furyl-2)-1-di-ethyl-amino-3-methyl-3-phenyl-propane. | | 116/0.25 | | (furyl-2)-diethyl-amino-acetonitrile. | do | 1 | 67 |
| 32 | 1-(furyl-2)-1-morpholyl-4-phenyl-butane. | | 154/0.5 | 156–157 | (furyl-2)-morpholyl-acetonitrile. | γ-phenyl-propyl-bromide. | 7 | 56 |
| 33 | 1-(thienyl-2)-1-dimethyl-amino-3-phenyl-propane. | | 134/0.4 | 168 | (thienyl-2)-di-methyl-amino-acetonitrile. | β-phenyl-ethyl-bromide. | 1 | 73 |
| 34 | [2,5-endomethylene-cyclo-hexene-(3)-yl-1]-di-methylamino-phenyl-methane. | | 103/0.35 | 191–192 | [2,5-endomethylene-cyclohexene-(3)-yl-1]-di-methylamino-acetonitrile. | bromo-benzene | 1 | 53 |
| 35 | 1-[2,5-endomethylene-cyclohexene-(3)-yl-1]-1-dimethylamino-2-phenyl-ethane. | | 119/0.5 | 182 | do | benzyl chloride | 1 | 63 |
| 36 | 1-[2,5-endomethylene-cyclohexene-(3)-yl-1]-1-dimethylamino-3-phenyl-propane. | | 135/0.8 | 184 | do | β-phenyl-ethyl-bromide. | 1 | 50 |
| 37 | [2,5-endomethylene-cyclohexene-(3)-yl-1]-diethylamino-phenyl-methane. | | 140–143/1.0 | 183 | [2,5-endomethylene-cyclohexene-(3)-yl-1]-diethylamino-acetonitrile. | bromo-benzene | 1 | 50 |
| 38 | 1-[2,5-endomethylene-cyclohexene-(3)-yl-1]-1-diethylamino-2-phenyl-ethane. | | 153/1.0 | 163–164 | do | benzyl chloride | 1 | 55 |
| 39 | 1-[2,5-endomethylene-cyclohexene-(3)-yl-1]-1-diethylamino-3-phenyl-propane | | 146/0.15 | 146 | do | β-phenyl-ethyl-bromide. | 1 | 51 |

| Example No. | Tertiary Amine Produced | M.P., °C. | B.P., °C./mm. Hg | M.P. of Hydrochloride, °C. | Acetonitrile Reagent | Grignard Reagent from magnesium and— | Reaction procedure as in Example No. | Yield, percent of theory |
|---|---|---|---|---|---|---|---|---|
| 40 | 1-[2,5-endomethylene-cyclohexene-(3)-yl-1]-1-diethylamino-4-phenyl-butane. | | 165/1.0 | 152–153 | [2,5-endomethylene-cyclohexene-(3)-yl-1]-diethylamino-acetonitrile. | γ-phenyl-propyl-bromide. | 1 | 65 |
| 41 | 1-[2,5-endomethylene-cyclohexene-(3)-yl-1]-1-diethylamino-butane. | | 78/0.15 | 122 | ......do...... | n-propyl-bromide. | 1 | 75 |
| 42 | 1-[2,5-endomethylene-cyclohexene-3-yl-1]-1-di-n-butylamino-4-phenyl-butane. | | 154–156/0.6 | | [2,5-endomethylene cyclohexene-(3)-yl-1]-di-n-butylamino-acetonitrile. | γ-phenyl-propyl-bromide. | 1 | 68 |
| 43 | [2,5-endomethylene-cyclohexene-(3)-yl-1]-(methyl-benzyl-amino)-phenyl-methane. | | 183/0.6 | | [2,5-endomethylene cyclohexene-(3)-yl-1]-(methyl-benzylamino)-acetonitrile. | bromo-benzene. | 1 | 68 |
| 44 | 1-[2,5-endomethylene-cyclohexene-(3)-yl-1]-1-(methyl-benzylamino)-2-phenyl-ethane. | | 188/0.9 | 182–183 | ......do...... | benzyl chloride. | 1 | 45 |
| 45 | 1-[2,5-endomethylene-cyclohexene-(3)-yl-1]-1-(methyl-benzylamino)-3-phenyl-propane. | | 188/0.7 | 179 | ......do...... | β-phenyl ethyl-bromide. | 1 | 46 |
| 46 | 1-[2,5-endomethylene-cyclohexene-(3)-yl-1]-1-(methyl-benzylamino)-4-phenyl-butane. | | 178/0.9 | 190–192 | ......do...... | γ-phenyl-propyl-bromide. | 1 | 46 |
| 47 | 1-[2,5-endomethylene-cyclohexene-(3)-yl-1]-1-(dicyclohexylamino)-4-phenyl-butane. | | 205/0.25 | | [2,5-endomethylene-cyclohexene-(3)-yl-1]-dicyclohexylamino-acetonitrile. | ......do...... | 1 | 40 |
| 48 | [2,5-endomethylene-cyclohexene-(3)-yl-1]-pyrrolidyl-phenyl-methane. | | 133/0.6 | 221 | [2,5-endomethylene-cyclohexene-3-yl-1]-pyrrolidyl-acetonitrile. | bromo-benzene. | 1 | 79 |
| 49 | 1-[2,5-endoemthylene-cyclohexene-(3)-yl-1]-1-pyrrolidyl-2-phenyl-ethane. | | 151–152/0.5 | 181 | ......do...... | benzylchloride. | 1 | 70 |
| 50 | 1-[2,5-endomethylene-cyclohexene-(3)-yl-1]-1-pyrrolidyl-3-phenyl-propane. | | 154/0.5 | 112 | ......do...... | β-phenyl-ethyl-bromide. | 1 | 57 |
| 51 | 1-[2,5-endomethylene-cyclohexene-(3)-yl-1]-1-pyrrolidyl-4-phenyl-butane. | | 165/0.6 | | ......do...... | γ-phenyl-propyl-bromide. | 1 | 58 |
| 52 | [2,5-endomethylene-cyclohexene-(3)-yl-1]-pyrrolidyl-cyclohexyl-methane. | | 78/0.3 | 229 | ......do...... | cyclohexyl-chloride. | 1 | 55 |
| 53 | 1-[2,5-endomethylene-cyclohexene-(3)-yl-1]-1-pyrrolidyl-propane. | | 82/0.2 | 95 | ......do...... | ethyl bromide. | 1 | 91 |
| 54 | 1-[2,5-endomethylene-cyclohexene-(3)-yl-1]-1-piperidyl-2-phenyl-ethane. | | 150/0.3 | 157 | [2,5-endomethylene-cyclohexene-(3)-yl-1]-piperidyl-acetonitrile. | benzyl chloride. | 1 | 70 |
| 55 | 1-[2,5-endomethylene-cyclohexene-(3)-yl-1]-1-piperidyl-3-phenyl-propane. | | 152/0.6 | 144–145 | ......do...... | β-phenyl-ethyl-bromide. | 1 | 65 |
| 56 | 1-[2,5-endomethylene-cyclohexene-(3)-yl-1]-1-piperidyl-4-phenyl-butane. | | 158–160/0.4 | 130–132 | ......do...... | γ-phenyl-propyl-bromide. | 1 | 63 |
| 57 | [2,5-endomethylene-cyclohexene-(3)-yl-1]-piperidyl-cyclohexyl-methane. | | 60/0.4 | 162 | ......do...... | cyclohexyl-chloride. | 1 | 51 |
| 58 | 1-[2,5-endomethylene-cyclohexene-(3)-yl-1]-1-piperidyl-propane. | | 102–103/0.5 | 130–132 | ......do...... | ethyl bromide. | 1 | 88 |
| 59 | 1-[2,5-endomethylene-cyclohexene-(3)-yl-1]-1-piperidyl-butane. | | 110–112/0.5 | 132–133 | ......do...... | n-propyl-bromide. | 1 | 65 |
| 60 | 1-[2,5-endomethylene-cyclohexene-(3)-yl-1]-1-piperidyl-pentane. | | 106/0.1 | 157–158 | ......do...... | n-butyl-bromide. | 1 | 87 |
| 61 | 1-[2,5-endomethylene-cyclohexene-(3)-yl-1]-1-piperidyl-3-methyl-3-phenyl-propane. | | 156–158/0.3 | 171 | ......do...... | β-bromo-isopropyl-benzene. | 1 | 61 |
| 62 | [2,5-endomethylene-cyclohexene-(3)-yl-1]-(methyl-phenylamino)-phenyl-methane. | | 159–160/0.35 | | [2,5-endomethylene-cyclohexene-(3)-yl-1]-(methyl-phenylamino)-acetonitrile. | bromo-benzene. | 1 | 68 |
| 63 | 1-[2,5-endomethylene-cyclohexene-(3)-yl-1]-(methyl-phenylamino)-4-phenyl-butane. | | 180–183/0.5 | | ......do...... | γ-phenyl-propyl-bromide. | 1 | 55 |
| 64 | [2,5-endomethylene-cyclohexene-(3)-yl-1]-(methyl-phenylamino)(4-methyl-phenyl)-methane. | | 170–172/0.2 | | ......do...... | p-bromo-toluene. | 1 | 50 |
| 65 | 1-cyclohexyl-1-di-methyl-amino-2-phenyl-ethane. | | 135–136/0.7 | 207 | cyclohexyl-dimethyl-amino-acetonitrile. | benzyl chloride. | 1 | 81 |
| 66 | 1-cyclohexyl-1-di-methyl-amino-3-phenyl-propane. | | 142–143/0.65 | 169–170 | ......do...... | β-phenyl-ethyl-bromide. | 1 | 76 |
| 67 | 1-cyclohexyl-1-dimethyl-amino-4-phenyl-butane. | | 153–/0.7 | 152–153 | ......do...... | γ-phenyl-propyl-bromide. | 1 | 62 |
| 68 | 1-cyclohexyl-1-diethyl-amino-2-phenyl-ethane. | | 131–132/0.8 | 110 | cyclohexyl-diethylamino-acetonitrile. | benzylchloride. | 1 | 53 |

| Example No. | Tertiary Amine Produced | M.P., °C. | B.P., °C./ mm. Hg | M.P. of Hydrochloride, °C. | Acetonitrile Reagent | Grignard Reagent from magnesium and— | Reaction procedure as in Example No. | Yield, percent of theory |
|---|---|---|---|---|---|---|---|---|
| 69 | 1-cyclohexyl-1-diethyl-amino-4-phenyl-butane. | | 150-152/0.7 | | cyclohexyl-diethylamino-acetonitrile. | γ-phenyl-propyl-bromide. | 1 | 56 |
| 70 | cyclohexyl-diethylamino-(4-methyl-phenyl)-methane. | | 122/0.2 | 167-169 | ___do___ | p-bromo-toluene | 1 | 52 |
| 71 | 1-cyclohexyl-1-diethyl-amino-2-(4-methyl-phenyl)-ethane. | | 135-137/0.5 | 140-142 | ___do___ | p-xylyl-bromide | 1 | 55 |
| 72 | 1-cyclohexyl-1-pyrrolidyl-5-phenyl-pentane. | | 162/0.2 | | cyclohexyl-pyrrolidyl-acetonitrile. | Δ-phenyl butyl-chloride. | 1 | 55 |
| 73 | cyclohexyl-piperidyl-phenyl-methane. | | 118-120/0.9 | | cyclohexyl-piperidyl-acetonitrile. | bromo-benzene | 1 | 41 |
| 74 | 1-cyclohexyl-1-piperidyl-2-phenyl-ethane. | | 135/0.7 | 207 | ___do___ | benzyl chloride | 1 | 39 |
| 75 | 1-cyclohexyl-1-piperidyl-3-phenyl-propane. | | 133-134/0.15 | 178 | ___do___ | β-phenyl-ethyl-bromide. | 1 | 37 |
| 76 | 1-cyclohexyl-1-piperidyl-4-phenyl-butane. | | 145/0.1 | 171 | cyclohexyl-piperidyl-acetonitrile. | γ-phenyl-propyl-bromide. | 1 | 80 |
| 77 | 1-[cyclohexene-(1)-yl-1]-1-pyrrolidyl-4-phenyl-butane. | | 160-162/0.5 | 157-158 | [cyclohexene-(1)-yl-1]-pyrrolidyl-acetonitrile. | ___do___ | 1 | 40 |
| 78 | 1-[cyclohexene-(1)-yl-1]-1-piperidyl-4-phenyl-butane. | | 170-172/0.5 | 196-197 | [cyclohexene-(1)-yl-1]-piperidyl-acetonitrile. | ___do___ | 1 | 55 |
| 79 | (furyl-2)-dimethylamino-phenyl-methane. | | 89/0.4 | 158 | (furyl-2)-dimethylamino-acetonitrile. | bromo-benzene | 1 | 45 |
| 80 | 1-(furyl-2)-1-dimethyl-amino-4-phenyl-butane. | | 145/0.7 | 136 | ___do___ | γ-phenyl-propyl-bromide. | 1 | 62 |
| 81 | 1-(furyl-2)-1-dimethyl-amino-5-phenyl-pentane. | | 112-114/0.15 | | ___do___ | Δ-phenyl-butyl-chloride. | 1 | 51 |
| 82 | (furyl-2)-dimethylamino-(4-methyl-phenyl)-methane. | | 85/0.15 | 104-105 | ___do___ | p-bromo-toluene | 1 | 66 |
| 83 | 1-(furyl-2)-1-dimethyl-amino-3-methyl-3-phenyl-propane. | | 96-97/0.2 | 148-149 | ___do___ | β-bromo-isopropyl-benzene. | 1 | 66 |
| 84 | 1-(furyl-2)-1-diethyl-amino-4-phenyl-butane. | | 142/0.7 | | (furyl-2)-diethylamino-acetonitrile. | γ-phenyl-propyl-bromide. | 1 | 90 |
| 85 | 1-(furyl-2)-1-di-(n-butyl)-amino-2-phenyl-ethane. | | 145/0.3 | | (furyl-2)-di-(n-butyl)-amino-acetonitrile. | benzyl chloride | 1 | 51 |
| 86 | 1-(furyl-2)-1-di-(n-butyl)-amino-4-phenyl-butane. | | 162/0.3 | | ___do___ | γ-phenyl-propyl-1-bromide. | 1 | 46 |
| 87 | (furyl-2)-piperidyl-phenyl-methane. | | 125/0.3 | 184 | (furyl-2)-piperidyl-acetonitrile. | bromo-benzene | 1 | 67 |
| 88 | 1-(furyl-2)-1-piperidyl-4-phenyl-butane. | | 149/0.3 | 151 | ___do___ | δ-phenyl-propyl-bromide. | 1 | 64 |
| 89 | (thienyl-2)-dimethyl-amino-phenyl-methane. | | 93-94/0.2 | | (thienyl-2)-dimethyl-amino-acetonitrile. | bromo-benzene | 1 | 80 |
| 90 | 1-(thienyl-2)-1-dimethyl-amino-4-phenyl-butane. | | 149/0.5 | 110 | ___do___ | γ-phenyl-propyl-bromide. | 1 | 61 |
| 91 | 1-(thienyl-2)-1-dimethyl-amino-3-methyl-3-phenyl-propane. | | 120/0.2 | 185 | ___do___ | β-bromo-isopropyl-benzene. | 11 | 61 |
| 92 | (thienyl-2)-piperidyl-phenyl-methane. | 71 | | 211 | (thienyl-2)-piperidyl-acetonitrile. | bromo-benzene | 1 | 62 |
| 93 | 1-(thienyl-2)-1-pyrroli-dyl-4-phenyl-butane. | | 175/0.2 | 120 | (thienyl-2)-pyrrolidyl-acetonitrile. | γ-phenyl-propyl-bromide. | 1 | 59 |
| 94 | 1-(thienyl-2)-1-piperidyl-propane. | | 88-90/0.25 | | (thienyl-2)-piperidylaceto-nitrile. | ethyl bromide | 1 | 95 |
| 95 | 1-[cyclohexene-(1)-yl-1]-1-pyrrolidyl-2-phenyl-ethane. | | 142-143/0.3 | 212 | [cyclohexene-(1)-yl-1]-pyrrolidyl-aceto-nitrile. | benzyl chloride | 1 | 61 |
| 96 | 1-[cyclohexene-(1)-yl-1]-1-piperidyl-2-phenyl-ethane. | | 170-172/0.9 | | [cyclohexene-(1)-yl-1]-piperidyl-acetonitrile. | ___do___ | 1 | 65 |
| 97 | 1-[2,5-endomethylene-cyclohexene-(3)-yl-1]-1-morpholyl-4-phenyl-butane. | | 165-166/0.3 | | [2,5-endomethylene-cyclohexene-(3)-yl-1]-morpholyl-acetonitrile. | γ-phenyl-propyl-bromide. | 1 | 55 |
| 98 | 1-cyclohexyl-1-morpholyl-4-phenyl-butane. | | 166-167/0.35 | | cyclohexyl-morpholyl-acetonitrile. | ___do___ | 1 | 50 |
| 99 | 1-[2,5-endomethylene-cyclohexene-(3)-yl-1]-(methyl-[β-hydroxy-ethyl]-amino)-2-phenyl-ethane. | | 137-138/0.1 | | [2,5-endomethylene-cyclohexene-(3)-yl-1]-(methyl-[β-hydroxy-ethyl]-amino)-acetonitrile. | benzyl chloride | 1 | 60 |
| 100 | 1-[2,5-endomethylene-cyclohexene-(3)-yl-1]-1-dimethylamino-3-methyl-3-phenyl-propane. | | 118/0.4 | 180 | [2,5-endomethylene-cyclohexene-(3)-yl-1]-dimethylamino-acetonitrile. | β-bromo-isopropyl-benzene. | 1 | 65 |
| 101 | 1-[2,5-endomethylene-cyclohexene-(3)-yl-1]-1-diethylamino-3-methyl-3-phenyl-propane. | | 121/0.1 | | [2,5-endomethylene-cyclohexene-(3)-yl-1]-diethyl-amino-acetonitrile. | ___do___ | 1 | 61 |
| 102 | 1-[2,5-endomethylene-cyclohexene-(3)-yl-1]-(methyl-[β-hydroxyethyl]-amino)-4-phenyl-butane. | | 160-162/0.15 | | [2,5-endomethylene-cyclohexene-(3)-yl-1]-(methyl-[β-hydroxyethyl]-amino)-acetonitrile. | γ-phenyl-propyl-bromide. | 1 | 80 |
| 103 | 1-[2,5-endomethylene-cyclohexene-(3)-yl-1]-1-piperidyl-3-methyl-butane. | | 123/1.5 | ¹ 155-157 | [2,5-endomethylene-cyclohexene-(3)-yl-1]-piperidyl-acetonitrile. | iso-butyl-bromide | 1 | 60 |
| 104 | 1-[2,5-endomethylene-cyclohexene-(3)-yl-1]-1-piperidyl-3-methyl-3-phenyl-propane. | | 162/0.5 | 171 | ___do___ | β-bromo-iso-propyl-benzene. | 1 | 78 |
| 105 | 1-[2,5-endomethylene-cyclohexene-(3)-yl-1]-1-piperidyl-5-phenyl-pentane. | | 198/0.7 | | ___do___ | Δ-phenyl-butyl-chloride. | 1 | 56 |

| Example No. | Tertiary Amine Produced | M.P., °C. | B.P., °C./ mm. Hg | M.P. of Hydrochloride, °C. | Acetonitrile Reagent | Grignard Reagent from magnesium and— | Reaction procedure as in Example No. | Yield, percent of theory |
|---|---|---|---|---|---|---|---|---|
| 106 | Cyclohexyl-dimethyl-amino-(4-methyl-phenyl)-methane. | | 113–114/0.65 | 242–243 | cyclohexyl-dimethyl-amino-acetonitrile. | p-bromo-toluene | 1 | 62 |
| 107 | 1-cyclohexyl-1-dimethyl-amino-3-methyl-3-phenyl-propane. | | 99/0.03 | 135–137 | ___do___ | β-bromo-iso-propyl-benzene. | 1 | 66 |
| 108 | 1-cyclohexyl-1-diethyl-amino-3-methyl-3-phenyl-propane. | | 134/0.25 | 162–163 | cyclohexyl-diethyl-amino-acetonitrile. | ___do___ | 1 | 62 |
| 109 | 1-cyclohexyl-1-pyrrolidyl-4-phenyl-butane. | | 123/0.06 | 134–135 | cyclohexyl-pyrrolidyl-acetonitrile. | γ-phenyl-propyl-bromide. | 1 | 70 |
| 110 | 1-cyclohexyl-1-piperidyl-3-methyl-3-phenyl-propane. | | 155/0.7 | 210 | cyclohexyl-piperidyl-acetonitrile. | β-bromo-iso-propyl-benzene. | 1 | 67 |
| 111 | 1-cyclohexyl-1-piperidyl-5-phenyl-pentane. | | 126–127/0.04 | 153–154 | ___do___ | Δ-phenyl-butyl-chloride. | 1 | 52 |
| 112 | 1-[cyclohexene-(1)-yl-1]-diethyl-amino-4-phenyl-butane. | | 157–158/0.6 | | [cyclohexene-(1)-yl-1]-diethyl-amino-acetonitrile. | γ-phenyl-propyl-bromide. | 1 | 67 |
| 113 | 1[cyclohexene-(1)-yl-1]-1-pyrrolidyl-3-methyl-3-phenyl-propane. | | 138–140/0.4 | | [cyclohexene-(1)-yl-1]-pyrrolidyl-acetonitrile. | β-bromo-iso-propyl-benzene. | 1 | 73 |
| 114 | 1-[cyclohexene-(3)-yl-1]-1-piperidyl-3-methyl-3-phenyl-propane. | | 86–87/0.4 | | [cyclohexene-(3)-yl-1]-piperidyl-acetonitrile. | ___do___ | 1 | 71 |
| 115 | 1-[cyclohexene-(3)-yl-1]-1-dimethyl-amino-2-phenyl-ethane. | | 95/0.2 | 190 | [cyclohexene-(3)-yl-1]-dimethylamino-acetonitrile. | benzyl chloride | 1 | 61 |
| 116 | 1-[cyclohexene-(3)-yl-1]-1-dimethyl-amino-4-phenyl-butane. | | 115/0.1 | 138 | ___do___ | γ-phenyl-propyl-bromide. | 1 | 78 |
| 117 | 1[cyclohexene-(3)-yl-1]-1-dimethylamino-3-methyl-3-phenyl-propane. | | 103–104/0.1 | 151 | ___do___ | β-bromo-iso-propyl-benzene. | 1 | 55 |
| 118 | 1-[cyclohexene-(3)-yl-1]-1-di-methyl-amino-2-(4-methoxy-phenyl)-ethane. | | 118/0.04 | 135 | ___do___ | p-bromo-anisole | 1 | 83 |
| 119 | 1-[cyclohexene-(3)-yl-1]-1-diethylamino-4-phenyl-butane. | | 134/0.06 | | [cyclohexene-(3)-yl-1]-diethylamino-acetonitrile. | γ-phenyl-propyl-bromide. | 1 | 82 |
| 120 | 1[cyclohexene-(3)-yl-1]-1-pyrrolidyl-4-phenyl-butane. | | 123/0.08 | 142–143 | [cyclohexene-(3)-yl-1]-pyrrolidyl-acetonitrile. | ___do___ | 1 | 74 |
| 121 | 1-[cyclohexene-(3)-yl-1]-1-piperidyl-2-phenyl-ethane. | | 120/0.1 | 218 | [cyclohexene-(3)-yl-1]-piperidyl-acetonitrile. | benzyl chloride | 1 | 60 |

¹ Decomposition.

As previously stated and illustrated in the preceding examples, the tertiary amines of the present invention are in many cases water-insoluble oils. It is, therefore, often convenient to use them pharmacologically and therapeutically as the more water-soluble acid addition salts derived from non-toxic inorganic or organic acids or in the form of quaternary ammonium salts derived from alkyl, aralkyl or cycloalkyl halogenides, dialkyl sulfates or p-toluene sulfonic acid alkyl esters.

Typical examples of pharmacologically useful non-toxic acid addition salts of the present tertiary amines are those formed with hydrochloric acid, hydrobromic acid, sulfuric acid, phosphoric acid, nitric acid, acetic acid, propionic acid, butyric acid, valeric acid, oxalic acid, malonic acid, succinic acid, maleic acid, fumaric acid, lactic acid, tartaric acid, citric acid, malic acid, benzoic acid, phthalic acid, cinnamic acid, salicyclic acid, nicotinic acid, 2-furoic acid and the like. The hydrochlorides, however, have been found to be particularly suitable for practical purposes.

Typical examples of pharmacologically useful, non-toxic quaternary compounds of the present tertiary amines are these formed with methyl iodide, methyl bromide, benzyl bromide, ethyl iodide, isobutyl bromide and other alkyl chlorides, bromides or iodides, dimethyl sulfate, diethyl sulfate, p-toluene sulfonic acid alkyl esters, cyclohexyl chlorides, bromides or iodides, cyclopentyl chlorides, bromides or iodides, and the like, in accordance with customary quaternizing procedures such as those illustrated in the preceding examples.

The group of compounds embraced by Formula I above are useful and effective pharmacological agents. More particularly, they exhibit papaverine-like myotropic spasmolytic activities which are surprisingly and unexpectedly greater than those of heretofore known tertiary amines of similar or analogous structure. In addition, certain compounds of this group possess other desirable pharmacological properties in addition to being spasmolytics, such as hypertensive, analgesic or hypotensive activity.

To demonstrate the unexpectedly improved myotropic spasmolytic properties of the tertiary amine compounds according to the present invention, certain representative compounds of the group defined by Formula I were subjected to comparative tests with tertiary amines of similar structure which have been described in the prior art. The test procedure employed for this comparison was that of R. Magnus [Pfluger's Archiv, vol. 102, page 124 (1904)], using isolated guinea pig intestines wherein spasms had been induced with barium chloride. The results of these comparative tests are shown in the following table. All of the compounds in question were tested

| Compound (as hydrochloride) | Relative value of spasmolytic activity |
|---|---|
| According to present invention: | |
| 1-(thienyl-2)-1-dimethylamino-4-phenyl-butane | 2.0 |
| 1-[2,5-endomethylene-cyclohexene-(3)-yl-1]-1-pyrrolidyl-3-phenyl-propane | 1.5 |
| 1-[cyclohexene-(1)-yl-1]-1-piperidyl-4-phenyl-butane | 2.0 |
| 1-cyclohexyl-1-pyrrolidyl-3-methyl-3-phenyl-propane | 2.0 |
| 1-cyclohexyl-1-piperidyl-5-phenyl-pentane | 2.5 |
| 1-(furyl-2)-1-dimethylamino-4-phenyl-butane | 1.2 |
| 1-[cyclohexene-(3)-yl-1]-1-diethylamino-4-phenyl-butane | 2.5 |
| Similar known tertiary amines: | |
| 1-phenyl-1-dimethylamino-propane | 0.2 |
| 1-(4-methyl-phenyl)-1-piperidyl-2-phenyl-ethane | 0.5 |
| 1-phenyl-2-dimethylamino-propane | 0.1 |
| 1-(4-hydroxy-phenyl)-1-piperidyl-2-phenyl-ethane | 0.5 |
| Diphenyl-dimethylamino-methane | 1.0 |
| 1-phenyl-1-dimethylamino-2-phenyl-ethane | 0.75 | in the form of their water-soluble, non-toxic hydrochloric acid addition salts.

The table shows that the relative myotropic spasmolytic activity of the representative compounds according to the present invention is up to 25 times greater than that of similar tertiary amines described in the prior art.

By additional pharmacological tests it was found that intraperitoneal administration of 4 mg./kg. 1-cyclohexyl-1-piperidyl-4-phenyl-butane hydrochloride in female guinea pigs caused an effective and rapid suppression of the spontaneous motility of the uterus as well as pronounced relaxation of this organ. Similarly, spontaneous movements of the urinary bladder of guinea pigs, induced with the aid of Mestinon (dimethylcarbamate of 3-hydroxy-1-methyl-pyridinium bromide), were suppressed by this compound. 1 - cyclohexyl - 1 - piperidyl-4-phenyl-butane also relieved artificially induced cardiospasms in rabbits upon intravenous administration of 2 mg./kg. The toxicity of the compound is very low, the $LD_{50}$ in mice being greater than 2 gm./kg. by subcutaneous administration.

Very similar properties are exhibited by 1-[2,5-endomethylene - cyclohexene - (3)-yl-1]-1-dimethylamino-4-phenyl-butane and 1-cyclohexyl - 1 - pyrrolidyl-4-phenyl-butane.

A few of the compounds according to the present invention exhibit hypertensive, i.e. blood pressure increasing, properties. Thus, for example, intravenous administration of 3 mg./kg. [2,5-endomethylene-cyclohexene-(3)-yl-1]-pyrrolidyl-phenyl-methane in cats produces an 80 mm. increase in the blood pressure.

A number of the tertiary amines embraced by Formula I are not only highly effective myotropic spasmolytics but also simultaneously exhibit effective analgesic activities. For the purpose of illustrating this desirable combined pharmacological property, a few representative compounds according to the present invention were subjected to comparative test with known tertiary amines having a similar structure. The myotropic activity of each compound in question was again determined on isolated guinea pig intestines by the method of R. Magnus (loc. cit.). The analgesic effectiveness was determined in each case by electrical stimulation of the tails of mice in accordance with the standard method of Reinhard-de Beer (Burn, Biological Standardization, Oxford University Press, 2nd edition, page 316). The tertiary amines in question were tested in the form of their water-soluble, non-toxic hydrochloric acid addition salts. The following table shows the results of these comparative tests.

TERTIARY AMINES OF PRESENT INVENTION

| Compound (as hydrochloride) | Increase in stimulus threshold, percent | Relative spasmolytic activity | Dose, subcutaneous, mg./kg. |
| --- | --- | --- | --- |
| 1-cyclohexyl-1-dimethylamino-2-phenyl-ethane | 200 | 1.0 | 50 |
| 1-cyclohexyl-1-dimethylamino-4-phenyl-butane | 240 | 1.0 | 50 |
| Cyclohexyl-dimethylamino-(4-methyl-phenyl)-methane | 80 | 0.75 | 10 |
| 1-[2,5-endomethylene-cyclohexene-(3)-yl-1]-1-dimethylamino-2-phenyl-ethane | 257 | 0.5 | 50 |

SIMILAR KNOWN TERTIARY AMINES

| | | | |
| --- | --- | --- | --- |
| 1-(p-hydroxy-phenyl)-3-dimethylamino-pentane | 88 | 0 | 20 |
| 1-(p-hydroxy-phenyl)-3-piperidyl-pentane | 0 | 0.5 | 50 |
| 1-(o-hydroxy-phenyl)-3-diethylamino-pentane | 70 | <0.5 | 10 |
| 1-(o-methoxy-phenyl)-2-(iso-propyl-benzyl-amino) propane | 0 | <0.5 | 50 |
| 1-(o-methoxy-phenyl)-2-(methyl-benzyl-amino)-propane | 100 | 0.5 | 50 |

The table clearly illustrates that the investigated tertiary amines according to the present invention exhibit much more effective simultaneous spasmolytic and analgesic activities than any of the known tertiary amines of similar chemical structure.

Furthermore, pharmacological tests on isolated small intestines of guinea pigs showed that some of the tertiary amines defined by Formula I, in addition to being effective myotropic spasmolytics, are distinguished by their high nicotinolytic activity. For example, 1-[2,5-endomethylene-cyclohexene - (3)-yl-1]-1-pyrrolidyl-3-phenyl-propane exhibits a sixteen times greater nicotinolytic activity than papaverine.

Finally, 1-cyclohexyl-1-pyrrolidyl-3-methyl-3 - phenyl-propane, in addition to being a spasmolytic agent which is twice as effective against barium chloride-induced spasms on isolated guinea pig intestines as papaverine, exhibits a 25% stronger hypotensive, i.e. blood pressure-reducing, activity in cats, rabbits and rats than papaverine. In addition, it has a coronary dilating effect which is about equal to that of papaverine, as determined in dogs by the bubble-flow method according to Eckenhoff et al., Am. J. Physiol., vol. 148, page 582 (1947). Its toxicity is very low; the $LD_{50}$, determined in mice, is 104 mg./kg. subcutaneously and 370 mg./kg. perorally.

The teriary amines disclosed herein and embraced by Formula I above are not only effective as pharmacological agents in laboratory test animals but also safe and effective for analogous use in human therapy, as determined by clinical tests.

For therapeutic use in human patients the tertiary amines according to the present invention are preferably administered in the form of their non-toxic acid addition salts, such as their hydrochlorides, hydrobromides, hydroiodides, citrates, tartrates, acetates, 8-chloro-theophyllinates, methosulfates and the like, or their non-toxic quaternary compounds.

For oral administration the tertiary amines, their non-toxic acid addition salts or quaternary compounds are admixed with a suitable inert carrier to produce tablets, pills, dragées, powders, solutions or other orally administerable compositions containing a sufficient amount of the active therapeutic ingredient to obtain the desired effect. In general, such oral preparations should contain at least 0.1% by weight of the active ingredient. In the case of tablets, pills and dragées the active ingredient content is preferably between 3 and 20% by weight, depending upon the desired dose in each unit of the oral preparation.

The inert carriers for the preparation of compositions particularly adapted for oral administration may be any one of the diluents, binders and the like commonly used for this purpose, such as sugar, lactose, talcum, starch, bolus alba, pectin, gelatin, gum arabic, methyl cellulose, yeast extract, agar-agar, tragacanth, stearic acid, magnesium sterate and so forth.

For parenteral administration sterile aqueous solutions or isotonic saline solutions of the tertiary amines are used. Such solutions should preferably contain from about 1 to 10% by weight of the active ingredient, depending upon the desired intensity of the therapeutic action.

While we have illustrated the present invention with the aid of certain specific embodiments thereof, it will be readily apparent to those skilled in the art that the invention is not limited to these embodiments, and that various changes and modifications may be made without departing from the spirit of the invention or the scope of the appended claims.

We claim:
1. Compounds selected from the group consisting of tertiary amines having the formula

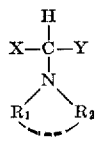

wherein
X is selected from the group consisting of 2,5-endomethylene-cyclohexenyl, 2,5-endomethylene - cyclohexyl, cyclohexyl, cyclohexenyl, furyl and thienyl,
Y is selected from the group consisting of alkyl with 2 to 7 carbon atoms, cyclohexyl, naphthyl, monopenyl, phenyl-substituted alkyl with 1 to 4 carbon atoms in the alkyl chain, tolyl, xylyl and methoxybenzyl, and
$R_1$ and $R_2$ are selected from the group consisting of alkyl with 1 to 4 carbon atoms, $\beta$-hydroxy-ethyl, cyclohexyl, phenyl, benzyl and, together with each other and the nitrogen atom, a heterocyclic radical selected from the group consisting of pyridyl, pyrrolidyl and morpholyl, their pharmaceutically useful non-toxic acid addition salts and their quaternary ammonium salts formed with a compound selected from the group consisting of alkyl halides, aralkyl halides, cycloalkyl halides, dialkylsulfates and p-toluene-sulfonic acid alkyl esters.

2. 1-cyclohexyl-1-dimethylamino-2-phenyl-ethane.
3. Cyclohexyl - dimethylamino - (4 - methyl - phenyl)-methane.
4. 1-cyclohexyl-1-pyrrolidyl-3-methyl - 3 - phenyl - propane.
5. 1-cyclohexyl-1-piperidyl-4-phenyl-butane.
6. 1-cyclohexyl-1-pyrrolidyl-4-phenyl-butane.
7. 1-cyclohexyl-1-piperidyl-5-phenyl-pentane.
8. 1-[cyclohexene-(3)-yl-1] - diethylamino - 4 - phenyl-butane.
9. 1-[cyclohexene-(1)-yl-1] - 1 - piperidyl - 4 - phenyl-butane.
10. 1-[2,5-endomethylene-cyclohexene-(3)-yl-1]-1- dimethylamino-2-phenyl-ethane.
11. 1-[2,5-endomethylene-cyclohexene-(3)-yl-1]-1- dimethylamino-4-phenyl-butane.

References Cited in the file of this patent
FOREIGN PATENTS

| | | |
|---|---|---|
| 674,246 | Great Britain | June 18, 1952 |
| 475,044 | Canada | July 3, 1951 |
| 533,541 | Canada | Nov. 20, 1956 |
| 963,424 | Germany | May 9, 1957 |
| 191,867 | Austria | Sept. 25, 1957 |

UNITED STATES PATENT OFFICE
CERTIFICATE OF CORRECTION

Patent No. 3,109,845                                   November 5, 1963

Ernst Seeger et al.

It is hereby certified that error appears in the above numbered patent requiring correction and that the said Letters Patent should read as corrected below.

Column 3, line 20, for "41.1 gm." read -- 41.4 gm. --; lines 25 to 30, for that portion of the formula reading

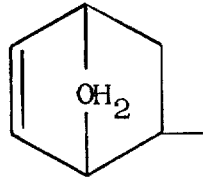         read         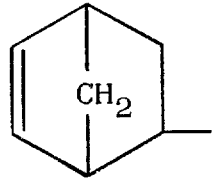

columns 15 and 16, in the table, seventh column, opposite "Example No. 107" for "genzene" read -- benzene --; same table, sixth column, opposite "Example No. 108" for "-ditehyl-" read -- -diethyl- --.

Signed and sealed this 12th day of May 1964.

(SEAL)
Attest:

ERNEST W. SWIDER                                EDWARD J. BRENNER
Attesting Officer                               Commissioner of Patents

UNITED STATES PATENT OFFICE
CERTIFICATE OF CORRECTION

Patent No. 3,109,845                      November 5, 1963

Ernst Seeger et al.

It is hereby certified that error appears in the above numbered patent requiring correction and that the said Letters Patent should read as corrected below.

Column 19, line 23, for "pyridyl" read -- piperidyl --.

Signed and sealed this 27th day of August 1968.

(SEAL)
Attest:

Edward M. Fletcher, Jr.                      EDWARD J. BRENNER

Attesting Officer                          Commissioner of Patents